United States Patent
Hyp et al.

(10) Patent No.: US 7,331,587 B1
(45) Date of Patent: Feb. 19, 2008

(54) WHEELBARROW WHEEL GUARD

(75) Inventors: Eric D. Hyp, Hanover, PA (US); Barry R. Albert, Dillsburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 58 days.

(21) Appl. No.: 11/493,417

(22) Filed: Jul. 26, 2006

(51) Int. Cl.
  *B62B 1/00* (2006.01)
(52) U.S. Cl. ............... 280/47.3; 280/47.32; 280/47.33; 280/47.17; 280/47.131
(58) Field of Classification Search ............... 280/47.3, 280/47.31, 47.32, 47.33, 47.17, 47.131
See application file for complete search history.

(56) References Cited

U.S. PATENT DOCUMENTS

| | | | |
|---|---|---|---|
| 273,225 A | 2/1883 | Clark | |
| 301,473 A | 7/1884 | Bean | |
| 686,298 A | 11/1901 | Hoffman | |
| 1,255,128 A | 2/1918 | Bayley | |
| 2,462,424 A | 2/1949 | Popplewell | |
| 2,588,210 A * | 3/1952 | Crisman et al. | ............... 175/41 |
| 3,235,281 A | 2/1966 | Faucette, Jr. | |
| D205,285 S | 7/1966 | Tonelli | |
| 5,791,667 A * | 8/1998 | Knoll | ............... 280/47.19 |
| 6,203,033 B1 * | 3/2001 | Knoll | ............... 280/47.3 |

* cited by examiner

*Primary Examiner*—Christopher P. Ellis
*Assistant Examiner*—Cynthia F. Collado
(74) *Attorney, Agent, or Firm*—David C. Jenkins; Eckert Seamans Cherin & Mellott, LLC

(57) ABSTRACT

A wheelbarrow including a wheel guard having tines with a reduced lateral width. The wheelbarrow has a frame assembly with two handle assemblies that are angled toward each other terminating in a forward yoke. The wheel guard has a bight, a first and second tine, each tine having a proximal end structured to be coupled to the bight and distal end structured to be coupled to the wheelbarrow yoke. Each tine has a longitudinal axis that is generally aligned with a handle assembly longitudinal axis. The first and second tine distal ends each have a first lateral thickness and each first and second tine proximal end has a second lateral thickness. The first and second tine distal end first lateral thickness is greater than the first and second tine proximal end second lateral thickness.

16 Claims, 2 Drawing Sheets

WHEELBARROW WHEEL GUARD

BACKGROUND OF THE INVENTION

1. Field of the Invention

This invention relates to a wheelbarrow and, more specifically, to a wheelbarrow having a standard frame assembly structured to accommodate a four inch wide wheel and a wheel guard structured to accommodate a six inch wide wheel.

2. Background Information

Wheelbarrows are one of the oldest inventions. A wheelbarrow has a platform or a hopper, a frame assembly having two handle portions, and a wheel. A typical wheelbarrow has two elongated handle portions coupled to the lower side of the platform or hopper. The handle portions are angled towards each other with the wider spacing located at the back side of the hopper. Thus, the forward ends of the handle portions are relatively close to each other and form a yoke. The wheel is rotatably coupled to the frame assembly at the yoke.

Over time the size and the configuration of general purpose wheelbarrows have been adapted to a standard ergonomic shape, as shown in FIG. 1. That is, for a typical user, an ergonomically shaped wheelbarrow 1 has first and second handle members 2, 3 with a length of about 60 inches. The handle members 2, 3 are separated by about 21.5 inches at the back side of the wheelbarrow 1 and by about 6.5 inches at the front side of the wheelbarrow 1. Thus, the longitudinal axes of the handle members 2, 3 are angled about 14.4 degrees relative to each other. The standard wheelbarrow 1 further has a wheel 4 having a diameter of about 16 inches. The wheel 4 is coupled to the forward end handle members 2, 3 at the yoke 5. A wheel guard 6 extends from the yoke 5 around the forward side of the wheel 4. The wheel guard 6 is generally U-shaped having an elongated first tine 7, a bight 8 and an elongated second tine 9. The longitudinal axis of the first tine 7 is structured to align with the longitudinal axis of the first handle member 2 and the longitudinal axis of the second tine 9 is structured to align with the longitudinal axis of the second handle member 3. Given the spacing of the handle members 2, 3 at the yoke 5 and the angle of convergence of the handle members 2, 3, and the configuration of the wheel guard 6, the standard wheelbarrow is structured to accommodate a wheel 4 having a width of about 4 inches. That is as shown on FIG. 1 the gap "G" between the wheel guard 6 and the lateral sides of the wheel 4 is about ⅞ inch.

One advantage to having a standard wheelbarrow configuration, especially on the frame assembly, is that manufacturing costs and assembly costs may be reduced due to mass production. That is, for example, the same frame assembly may be used on a wheelbarrow having a 30-gallon hopper or a 40-gallon hopper. Another advantage is that replacement parts may made and installed on different wheelbarrows. The disadvantage, however, is that certain parts may not fit into the standard wheelbarrow configuration. For example, to increase the weight that the wheelbarrow is structured to carry, one common adaptation is to increase the size, that is the width, or the wheel. In addition to the standard 4-inch wide wheel, a 6-inch wide wheel is another preferred wheel width. However, as noted above, the gap "G" between the wheel guard 6 and the lateral sides of the wheel 4 is about ⅞ inch. Thus, if a 6-inch wide wheel is installed on a standard wheelbarrow 1, the 6-inch wide wheel 4 would contact the wheel guard 6.

There is, therefore, a need for a wheel guard for a standard wheelbarrow frame assembly that is structured to accommodate a 6-inch wide wheel.

There is a further need for a wheel guard for a standard wheelbarrow frame assembly that is structured to accommodate a 6-inch wide wheel that may be installed as a replacement part on existing wheelbarrows.

SUMMARY OF THE INVENTION

These needs, and others, are met by a wheel guard having tines with a reduced lateral width. That is, a wheel guard has an elongated bight, and an elongated first and second tine, each with a proximal end structured to be coupled to the bight and distal end structured to be coupled to the yoke. The first and second tine distal ends each have a first lateral thickness and each first and second tine proximal end has a second lateral thickness. The first and second tine distal end first lateral thickness is greater than the first and second tine proximal end second lateral thickness. Thus, because the tines are thinner adjacent to the bight, the wheel may have a greater width. In this configuration, the longitudinal axes of the wheel guard tines may be in general alignment with the longitudinal axes of the frame assembly hopper support portions and/or the handle portions. Such a configuration is typically more pleasing to the eye than a configuration wherein the longitudinal axes of the wheel guard tines diverge from the longitudinal axes of the frame assembly hopper support portions and/or the handle portions.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, directional terms, such as, but not limited to, "forward," "back," "right," "left," "upper," "lower," and "lateral" correspond to the orientation of the wheelbarrow from the perspective of a user standing at the handle portion looking toward the hopper—that is, the normal position a user would occupy to move the wheelbarrow. Such directional terms are not limiting upon the claims.

As used herein, a "standard wheelbarrow frame assembly" is a wheelbarrow frame assembly having a first and second handle assembly and/or member with a length of about 60 inches. At the back side of the wheelbarrow the distal tips of the handle assemblies are separated by about 21.5 inches. At the front side of the wheelbarrow the handle assemblies are separated by about 6.5 inches. Thus, the longitudinal axes of the handle assemblies are angled about 14.4 degrees relative to each other.

As used herein, the word "conform" means that two or more elements are structured to have one element disposed snugly within the other element. Thus, while both elements have a similar or complimentary cross-sectional shape, the inner element is slightly smaller than the outer element.

Figure 1:
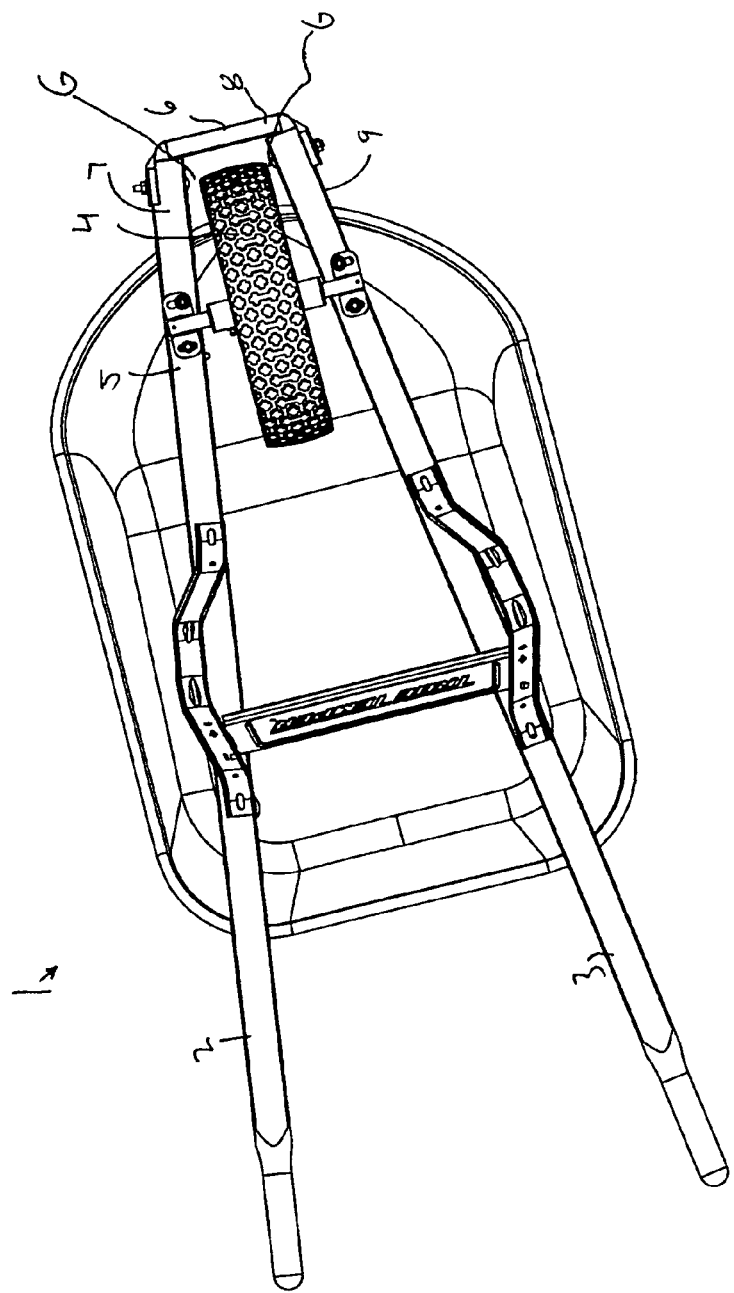
FIG. 1 is a bottom view of a prior art wheelbarrow.
Figure 2:
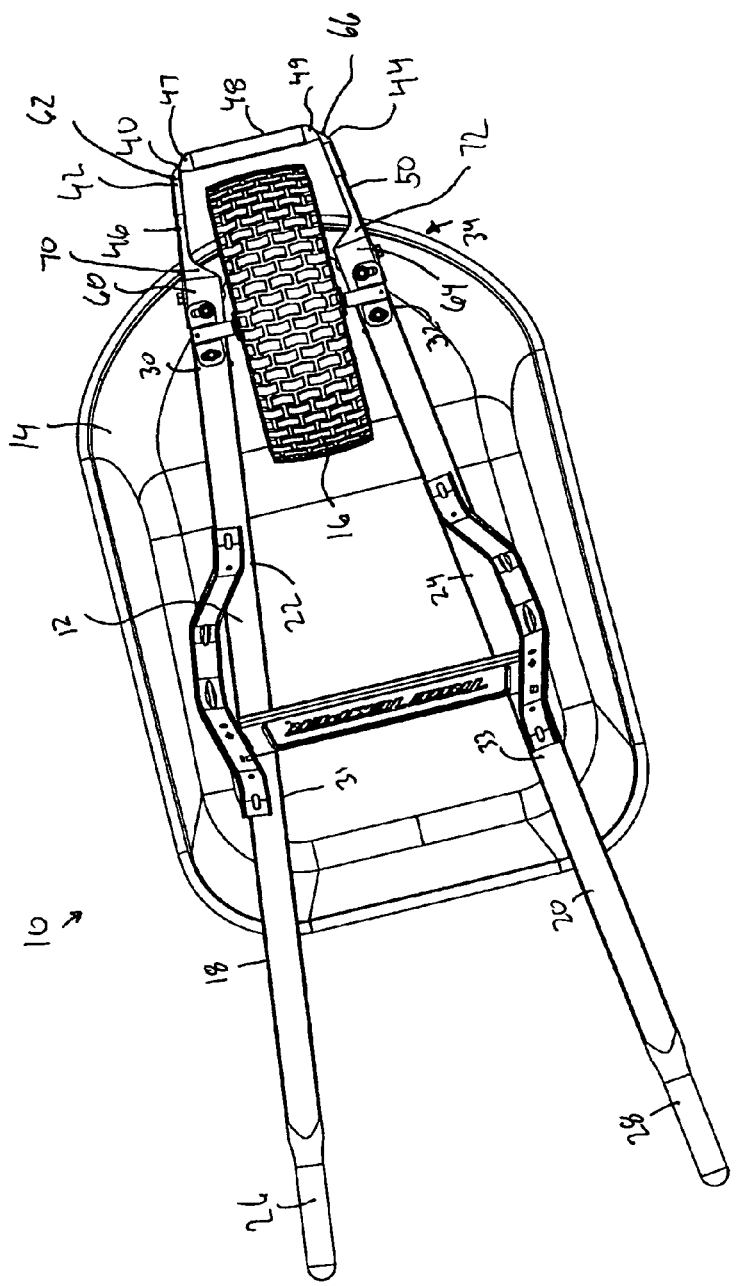
FIG. 2 is a bottom view of a wheelbarrow incorporating a wheel guard structured to accommodate a 6-inch wide wheel.

As shown in FIG. 2, a wheelbarrow 10 has a frame assembly 12, a hopper 14, and a wheel 16. The frame assembly 12 includes a first and a second handle assembly 18, 20 as well as other components such as, but not limited to, a support. As shown, each handle assembly 18, 20 is a single, unitary member, such as, but not limited to, a wooden rod. However, it is also known in the art to utilize multi-part handle assemblies such as, but not limited to, fitted metal rods (not shown). As such, although each handle assembly 18, 20 is shown as a single member, it is understood that a handle assembly may include multiple members or portions. Thus, each handle assembly 18, 20 may be said to have an elongated hopper support portion 22, 24 and an elongated handle portion 26, 28. That is, the first handle assembly 18 includes a first hopper support portion 22 that is coupled to a first handle portion 26. Similarly, the second handle assembly 18 includes a second hopper support portion 24 that is coupled to a second handle portion 28. In the preferred embodiment, the handle assemblies 18, 20 are formed from members having generally square cross-sections with a lateral width of between about 1 and 2 inches, and more preferably about 1⅞ inches.

The longitudinal axis of the first hopper support portion 22 is generally aligned with the longitudinal axis of the first handle portion 26. The longitudinal axis of the second hopper support portion 24 is generally aligned with the longitudinal axis of the second handle portion 28. The hopper 14 is coupled to the upper side of each hopper support portion 22, 24. Preferably, the longitudinal axes of the handle assemblies 18, 20 are at about 14.4 degrees relative to each other. The handle assemblies 18, 20 are about 60 inches long. At the back side of the hopper 14, the distal ends of the handle assemblies 18, 20 are separated by about 21.5 inches. At the forward side of the wheelbarrow 10 the handle assemblies 18, 20 are separated by about 6.5 inches. More specifically, each hopper support portion 22, 24 has a forward end 30, 32 which are separated by about 6.5 inches. The hopper support portion forward ends 30, 32 form a yoke 34. The wheel 16 is rotatably coupled to the yoke 34. Each hopper support portion also has a back end 31, 33.

The frame assembly 12 also includes a wheel guard 40. The wheel guard 40 has at least one member 42 defining a U-shaped body 44 having an elongated first tine 46, an elongated bight 48, and an elongated second tine 50. Preferably, the bight 48 is a generally straight member having a length of between about 7½ and 8½ inches, and more preferably about 8 inches. The bight 48 has a first end 47 and a second end 49. Each tine 46, 50 is also, preferably, a generally straight member having a length of between about 5 and 10 inches, and more preferably about 9 inches. The first tine 46 has a distal end 60 and a proximal end 62. The first tine proximal end 62 is structured to be coupled to the bight first end 47 and the first tine distal end 60 is structured to be coupled to the first hopper support portion forward end 30. Similarly, the second tine 50 has a distal end 64 and a proximal end 66. The second tine proximal end 66 is structured to be coupled to the bight second end 49 and the second tine distal end 64 is structured to be coupled to the second hopper support portion forward end 32. The longitudinal axis of the first tine 46 is structured to be generally aligned with the longitudinal axis of the first hopper support portion 22. The longitudinal axis of the second tine 50 is structured to be generally aligned with the longitudinal axis of the second hopper support portion 24.

To accommodate wheels 16 having a lateral width of greater than 4 inches, each tine 46, 50 has a reducing lateral width. That is, in the preferred embodiment, the tine distal ends 60, 64 have U-shaped cross sections, preferably opening toward the inner sides. The tine distal ends 60, 64 U-shaped cross sections conform to the hopper support portions 22, 24. Thus, the first tine distal end 60 has a first lateral thickness that corresponds to the cross-sectional shape of the first hopper support portion 22. The first tine proximal end 62, however, has a second lateral thickness. The first tine distal end 60 first lateral thickness is greater than the first tine proximal end 62 second lateral thickness. Similarly, the second tine distal end 64 has a first lateral thickness that corresponds to the cross-sectional shape of the second hopper support portion 24. The second tine proximal end 66, however, has a second lateral thickness. The second tine distal end 64 first lateral thickness is greater than the second tine proximal end 66 second lateral thickness. Preferably, the first tine distal end 60 first lateral thickness is between about 1 and 2 inches and the first tine proximal end 62 second lateral thickness is between about ⅜ and ⅝ inch. More preferably, the first tine distal end 60 first lateral thickness is about 1⅞ inches and the first tine proximal end 62 second lateral thickness is about ½ inch. Similarly, the second tine distal end 64 first lateral thickness is between about 1 and 2 inches and the second tine proximal end 66 second lateral thickness is between about ⅜ and ⅝ inch. More preferably, the second tine distal end 64 first lateral thickness is about 1⅞ inches and the second tine proximal end 66 second lateral thickness is about ½ inch.

While the reduction in thickness of the first and second tines 46, 50 between their first lateral thickness and their second lateral thickness may be a taper, that is a gradual change, in the preferred embodiment the change occurs as a step 70, 72. That is, a "step" is a reduction of thickness which occurs over a portion of the first and second tines 46, 50. On either side of the step 70, 72, the thickness of the first and second tines 46, 50 is generally constant.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A wheel guard for a standard wheelbarrow frame assembly, said standard wheelbarrow frame assembly having an elongated first hopper support portion and an elongated second hopper support portion, said first hopper support portion and said second hopper support portion each having a forward end and a back end, said first hopper support portion and said second hopper support portion maintained in a non-parallel spaced relation wherein said first hopper support portion forward end and said second hopper support portion forward end are disposed closer to each other than said first hopper support portion back end and said second hopper support portion back end, said first hopper support portion forward end and said second hopper support portion forward end defining a wheel yoke, wherein said wheel guard comprises:

at least one member defining a U-shaped body having an elongated first tine, an elongated bight, and an elongated second tine;

said first tine having a distal end and a proximal end, said proximal end structured to be coupled to said bight and said distal end structured to be coupled to said first hopper support portion;

said second tine having a distal end and a proximal end, said proximal end structured to be coupled to said bight and said distal end structured to be coupled to said second hopper support portion;
said bight having a first end and a second end;
said first tine proximal end coupled to said bight first end;
said second tine proximal end coupled to said bight second end;
wherein the longitudinal axis of said first tine is structured to be generally aligned with the longitudinal axis of said first hopper support portion;
wherein the longitudinal axis of said second tine is structured to be generally aligned with the longitudinal axis of said second hopper support portion; and
wherein said first tine distal end has a first lateral thickness and said first tine proximal end has a second lateral thickness, said first tine distal end first lateral thickness being greater than said first tine proximal end second lateral thickness; and
wherein said second tine distal end has a first lateral thickness and said second tine proximal end has a second lateral thickness, said second tine distal end first lateral thickness being grater than said second tine proximal end second lateral thickness.

2. The wheel guard of claim 1 wherein:
said first tine tapers between said first tine distal end first lateral thickness and said first tine proximal end second lateral thickness; and
said second tine tapers between said second tine distal end first lateral thickness and said second tine proximal end second lateral thickness.

3. The wheel guard of claim 1 wherein:
said first tine steps between said first tine distal end first lateral thickness and said first tine proximal end second lateral thickness; and
said second tine steps between said second tine distal end first lateral thickness and said second tine proximal end second lateral thickness.

4. The wheel guard of claim 3 wherein said first hopper support portion has a lateral thickness and said second hopper support portion has a lateral thickness, and wherein:
said first tine distal end is structured to conform to said first hopper support portion lateral thickness; and
said second tine distal end is structured to conform to said second hopper support portion lateral thickness.

5. The wheel guard of claim 4 wherein the inner side of the said first hopper support portion forward end and the inner side of said second hopper support portion forward end are disposed about 6.5 inches apart and wherein:
said first tine distal end first lateral thickness is between about 1 and 2 inches and said first tine proximal end second lateral thickness is between about ⅜ and ⅝ inch; and
said second tine distal end first lateral thickness is between about 1 and 2 inches and said second tine proximal end second lateral thickness is between about ⅜ and ⅝ inch.

6. The wheel guard of claim 5 wherein:
said first tine distal end first lateral thickness is about 1⅞ inches and said first tine proximal end second lateral thickness is about ½ inch; and
said second tine distal end first lateral thickness is about 1⅞ inches and said second tine proximal end second lateral thickness is about ½ inch.

7. A wheelbarrow comprising:
a frame assembly having a first elongated handle assembly and a second elongated handle assembly;
said first elongated handle assembly having an elongated first handle portion and a first hopper support portion, said first handle portion coupled to said first hopper support portion, wherein the longitudinal axis of said first handle portion and the longitudinal axis of said first hopper support portion are generally aligned;
said second elongated handle assembly having an elongated second handle portion and a second hopper support portion, said second handle portion coupled to said second hopper support portion, wherein the longitudinal axis of said second handle portion and the longitudinal axis of said second hopper support portion are generally aligned;
a hopper, said hopper coupled to said first hopper support portion and to said second hopper support portion;
said first hopper support portion and said second hopper support portion each having a forward end and a back end;
said first hopper support portion and said second hopper support portion maintained in a non-parallel spaced relation wherein said first hopper support portion forward end and said second hopper support portion forward end are disposed closer to each other than said first hopper support portion back end and said second hopper support portion back end;
said first hopper support portion forward end and said second hopper support portion forward end defining a wheel yoke;
a wheel rotatably coupled to, and disposed within, said wheel yoke;
a wheel guard with at least one member defining a U-shaped body having an elongated first tine, an elongated bight, and an elongated second tine;
said first tine having a distal end and a proximal end, said proximal end structured to be coupled to said bight and said distal end structured to be coupled to said first hopper support portion at said wheel yoke;
said second tine having a distal end and a proximal end, said proximal end structured to be coupled to said bight and said distal end structured to be coupled to said second hopper support portion at said wheel yoke;
said bight having a first end and a second end;
said first tine proximal end coupled to said bight first end;
said second tine proximal end coupled to said bight second end;
wherein the longitudinal axis of said first tine is structured to be generally aligned with the longitudinal axis of said first hopper support portion;
wherein the longitudinal axis of said second tine is structured to be generally aligned with the longitudinal axis of said second hopper support portion; and
wherein said first tine distal end has a first lateral thickness and said first tine proximal end has a second lateral thickness, said first tine distal end first lateral thickness being grater than said first tine proximal end second lateral thickness; and
wherein said second tine distal end has a first lateral thickness and said second tine proximal end has a second lateral thickness, said second tine distal end first lateral thickness being greater than said second tine proximal end second lateral thickness.

8. The wheelbarrow of claim 7 wherein:
said first tine tapers between said first tine distal end first lateral thickness and said first tine proximal end second lateral thickness; and
said second tine tapers between said second tine distal end first lateral thickness and said second tine proximal end second lateral thickness.

9. The wheelbarrow of claim 7 wherein:
said first tine steps between said first tine distal end first lateral thickness and said first tine proximal end second lateral thickness; and
said second tine steps between said second tine distal end first lateral thickness and said second tine proximal end second lateral thickness.

10. The wheelbarrow of claim 9 wherein:
said first hopper support portion has a lateral thickness and said second hopper support portion has a lateral thickness;
said first tine distal end is structured to conform to said first hopper support portion lateral thickness; and
said second tine distal end is structured to conform to said second hopper support portion lateral thickness.

11. The wheelbarrow of claim 10 wherein:
said first hopper support portion is a square body having a lateral width of about 1⅞ inches;
said second hopper support portion is a square body having a lateral width of about 1⅞ inches;
said first hopper support portion forward end and said second hopper support portion forward end are disposed about 6.5 inches apart;
said first tine distal end first lateral thickness is between about 1 and 2 inches and said first tine proximal end second lateral thickness is between about ⅜ and ⅝ inch; and
said second tine distal end first lateral thickness is between about 1 and 2 inches and said second tine proximal end second lateral thickness is between about ⅜ and ⅝ inch.

12. The wheelbarrow of claim 11 wherein:
said first tine distal end first lateral thickness is about 1⅞ inches and said first tine proximal end second lateral thickness is about ½ inch; and
said second tine distal end first lateral thickness is about 1⅞ inches and said second tine proximal end second lateral thickness is about ½ inch.

13. The wheelbarrow of claim 11 wherein the angle between the longitudinal axes of said first hopper support portion and said second hopper support portion is between about 10 and 20 degrees.

14. The wheelbarrow of claim 13 wherein the angle between the longitudinal axes of said first hopper support portion and said second hopper support portion is about 14.4 degrees.

15. The wheelbarrow of claim 14 wherein:
said first handle assembly has a length of between about 55 inches and 65 inches;
said second handle assembly has a length of between about 55 inches and 65 inches; and
wherein the distal ends of said first handle assembly and said second handle assembly are spaced between about 18 inches and 24 inches apart.

16. The wheelbarrow of claim 15 wherein:
said first handle assembly has a length of about 60 inches;
said second handle assembly has a length of about 60 inches; and
wherein the distal ends of said first handle portion and said second handle portion are spaced about 21.5 inches apart.

* * * * *